US009451386B2

(12) United States Patent
Huang et al.

(10) Patent No.: US 9,451,386 B2
(45) Date of Patent: Sep. 20, 2016

(54) RESOURCE SCHEDULING FOR MACHINE-TO-MACHINE DEVICES

(75) Inventors: Rui Huang, Beijing (CN); Honggang Li, Beijing (CN); Shantidev Mohanty, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 54 days.

(21) Appl. No.: 13/995,174

(22) PCT Filed: Dec. 27, 2011

(86) PCT No.: PCT/US2011/067343
§ 371 (c)(1),
(2), (4) Date: Sep. 17, 2013

(87) PCT Pub. No.: WO2013/009346
PCT Pub. Date: Jan. 17, 2013

(65) Prior Publication Data
US 2014/0010187 A1 Jan. 9, 2014

Related U.S. Application Data

(60) Provisional application No. 61/507,030, filed on Jul. 12, 2011.

(51) Int. Cl.
*H04W 4/00* (2009.01)
*H04W 56/00* (2009.01)
(Continued)

(52) U.S. Cl.
CPC ............ *H04W 4/005* (2013.01); *H04L 5/0039* (2013.01); *H04L 67/12* (2013.01); *H04W 56/004* (2013.01); *H04W 72/048* (2013.01); *H04W 72/0446* (2013.01)

(58) Field of Classification Search
CPC .................................................... H04W 28/04
USPC ......................................................... 370/329
See application file for complete search history.

(56) References Cited

U.S. PATENT DOCUMENTS

2005/0122999 A1* 6/2005 Scherzer .................. H04L 1/02 370/480
2006/0109813 A1* 5/2006 Saito .................... H04W 28/16 370/329

(Continued)

FOREIGN PATENT DOCUMENTS

CN 101932068 A 12/2010
CN 102013963 A 4/2011

(Continued)

OTHER PUBLICATIONS

International Search Report and Written opinion for PCT Patent Application No. PCT/US2011/067343, mailed on Aug. 29, 2012, 10 Pages.
Rui, et al., "M2Mgroup identifier functionalities and design requirements", IEEE 802.16 Broadband Wireless Access Working Group, IEEE C802.16p-11/0152, 2011, 5 Pages.
Rui, et al., "M2Mgroup control signaling scheme in 802.16m", IEEE 802.16 Broadband Wireless Access Working Group , IEEE C802 .16p-11/0156, 2011, 4 Pages.

(Continued)

*Primary Examiner* — Christopher R Crompton
(74) *Attorney, Agent, or Firm* — Alpine Technology Law Group LLC

(57) ABSTRACT

Briefly, in accordance with one or more embodiments, a base station schedules resources for one or more machine-to-machine devices in one or more machine-to-machine groups for a periodic duration persistently. The base station allocates resource blocks for the one or more devices within the scheduled resources, and then receives data packets transmitted from the one or more devices in the allocated resource blocks. The base station may pre-allocate a control channel to be used by the one or more devices during an idle mode for a periodic duration. Uplink synchronization may be performed if one or more of the devices wakes from the idle mode, and the base station may receive data from one or more of the devices in the pre-allocated control channel.

10 Claims, 9 Drawing Sheets

(51) Int. Cl.

| | |
|---|---|
| ***H04W 72/04*** | (2009.01) |
| ***H04L 5/00*** | (2006.01) |
| ***H04L 29/08*** | (2006.01) |

(56) References Cited

U.S. PATENT DOCUMENTS

| | | | | |
|---|---|---|---|---|
| 2006/0209874 | A1* | 9/2006 | Nagata | H04B 7/0413 370/445 |
| 2007/0019592 | A1* | 1/2007 | Otsuki | H04W 74/0816 370/338 |
| 2008/0085680 | A1* | 4/2008 | Kim et al. | 455/69 |
| 2009/0207796 | A1* | 8/2009 | Chakraborty | H04L 1/0006 370/329 |
| 2014/0029568 | A1* | 1/2014 | Wang et al. | 370/330 |

FOREIGN PATENT DOCUMENTS

| | | | |
|---|---|---|---|
| CN | 102056312 | A | 5/2011 |
| WO | 2010/082084 | A1 | 7/2010 |
| WO | WO2010128607 | * | 11/2010 |
| WO | WO2010128621 | * | 11/2010 |
| WO | 2013/009346 | A1 | 1/2013 |

OTHER PUBLICATIONS

Seokki, et al., "Allocation of ranging channel for M2M", IEEE 802.16 Broadband Wireless Access Working Group , IEEE C802 .16p-11/0139, 2011, 4 Pages.

International Preliminary Report on Patentability with Written Opinion received for PCT Patent Application No. PCT/US2011/67343, mailed on Jan. 23, 2014, 7 Pages.

Office Action received for Korean Patent Application No. 2014-7002272, mailed on May 6, 2015, 9 pages including 4 pages of English translation.

Lien, Shao-Yu, "Toward Ubiquitous Massive Accesses in 3GPP Machine-to-Machine Communications", Magazine, Apr. 2011, 9 pages, IEEE.

Office Action received for Korean Patent Application No. 2014-7002272, mailed on Dec. 14, 2015, 7 pages including 3 pages of English translation.

Office Action received for Chinese Patent Application No. 201180072245.X, mailed on Dec. 3, 2015, 33 pages including 23 pages of English translation.

Office Action received for Korean Patent Application No. 2014-7002272, mailed on Oct. 13, 2015, 6 pages including 2 pages of English translation.

* cited by examiner

RESOURCE SCHEDULING FOR MACHINE-TO-MACHINE DEVICES

CROSS-REFERENCE TO RELATED APPLICATIONS

The present application claims the benefit U.S. Provisional Application No. 61/507,030 filed Jul. 12, 2011. Said Application No. 61/507,030 is hereby incorporated herein by reference in its entirety.

BACKGROUND

Machine-to-machine (M2M) communication systems may involve an arrangement of devices in a network to periodically transmit and/or receive relatively small amounts of data to a remote application/server. Machine-to-machine systems are sometimes referred to as an "Internet of things" to exchange information between a subscriber station and a server in a core network via a wireless link with a base station or a wired link, or alternatively between other subscriber stations, wherein the exchange of information may be carried out without requiring or involving human interaction. For example, field data may be gathered by the M2M devices and sent back to a monitoring station for collection and analysis. In such an example, the M2M devices may comprise parking meters. When the parking meter is full of coins and is ready to be emptied, a given parking meter may communicate its state to a monitoring server coupled to the network, in which case an operator may then go that parking meter and remove the coins stored therein. In yet another example, M2M devices may be deployed to monitor for the presence of a specified hazardous substance such as a chemical agent, a biological agent, and/or a radionuclide wherein the M2M device includes an appropriate sensor.

In an M2M system, a large number of M2M devices in a group may be served in a domain of an M2M base station, involving a large amount of interaction between the base station and the M2M devices. As a result, the overall control signaling overhead may be very high. In general, M2M services involve a small amount of infrequent transmissions that are time controlled wherein the data is transmitted in a predefined interval. If a dynamic resource scheduling approach were to be applied to an M2M system, the control signaling may be on the order of about 50 percent. Application of persistent scheduling in an M2M system may be utilized to reduce the control signaling overhead. However, a typical persistent scheduling system may be inefficient for M2M devices because it is directed toward a single user, but the data packets for M2M devices generally are too small to occupy multiple persistent durations over a long interval.

DESCRIPTION OF THE DRAWING FIGURES

Claimed subject matter is particularly pointed out and distinctly claimed in the concluding portion of the specification. However, such subject matter may be understood by reference to the following detailed description when read with the accompanying drawings in which:

Figure 6:
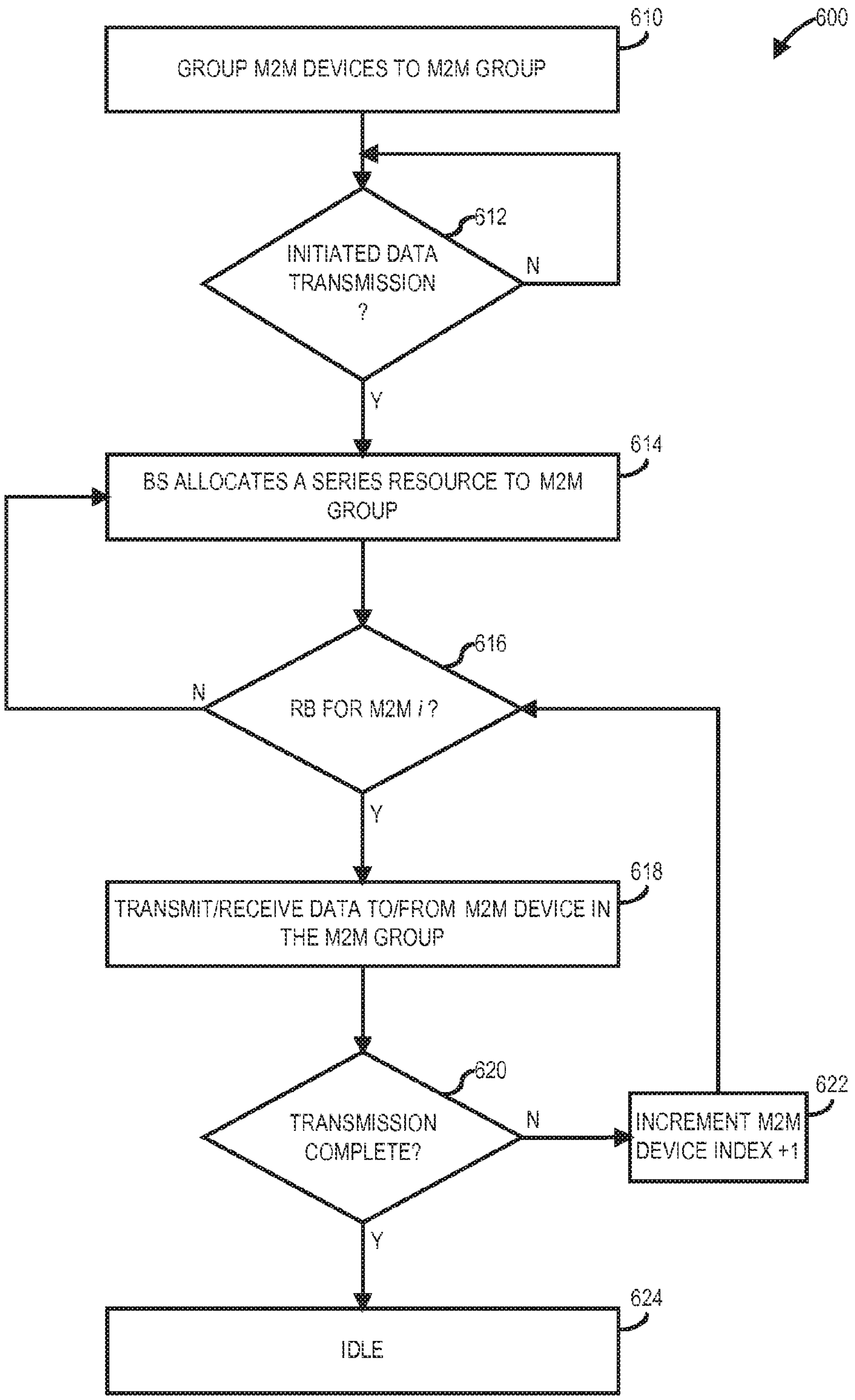
Figure 7:
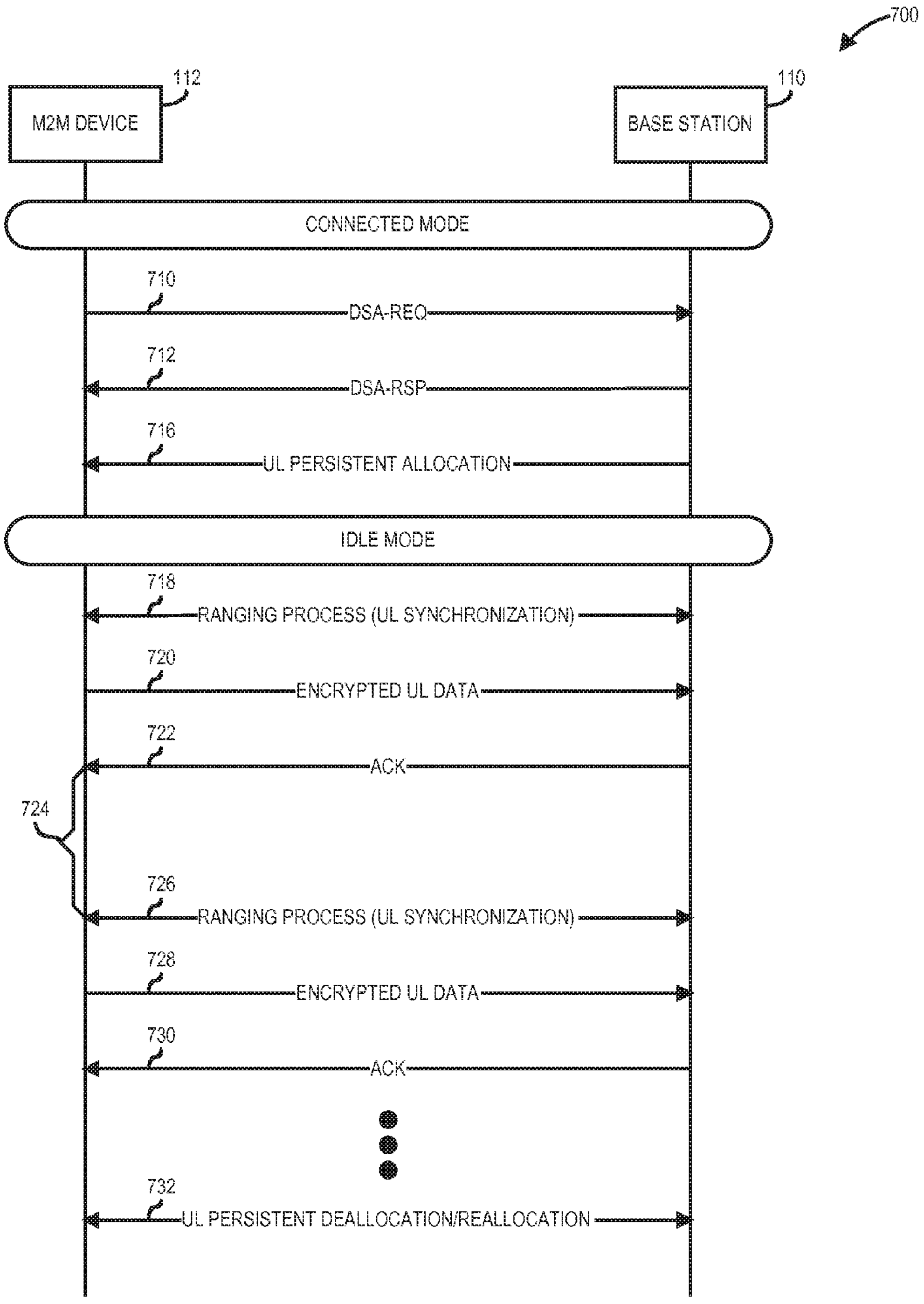
Figure 8:
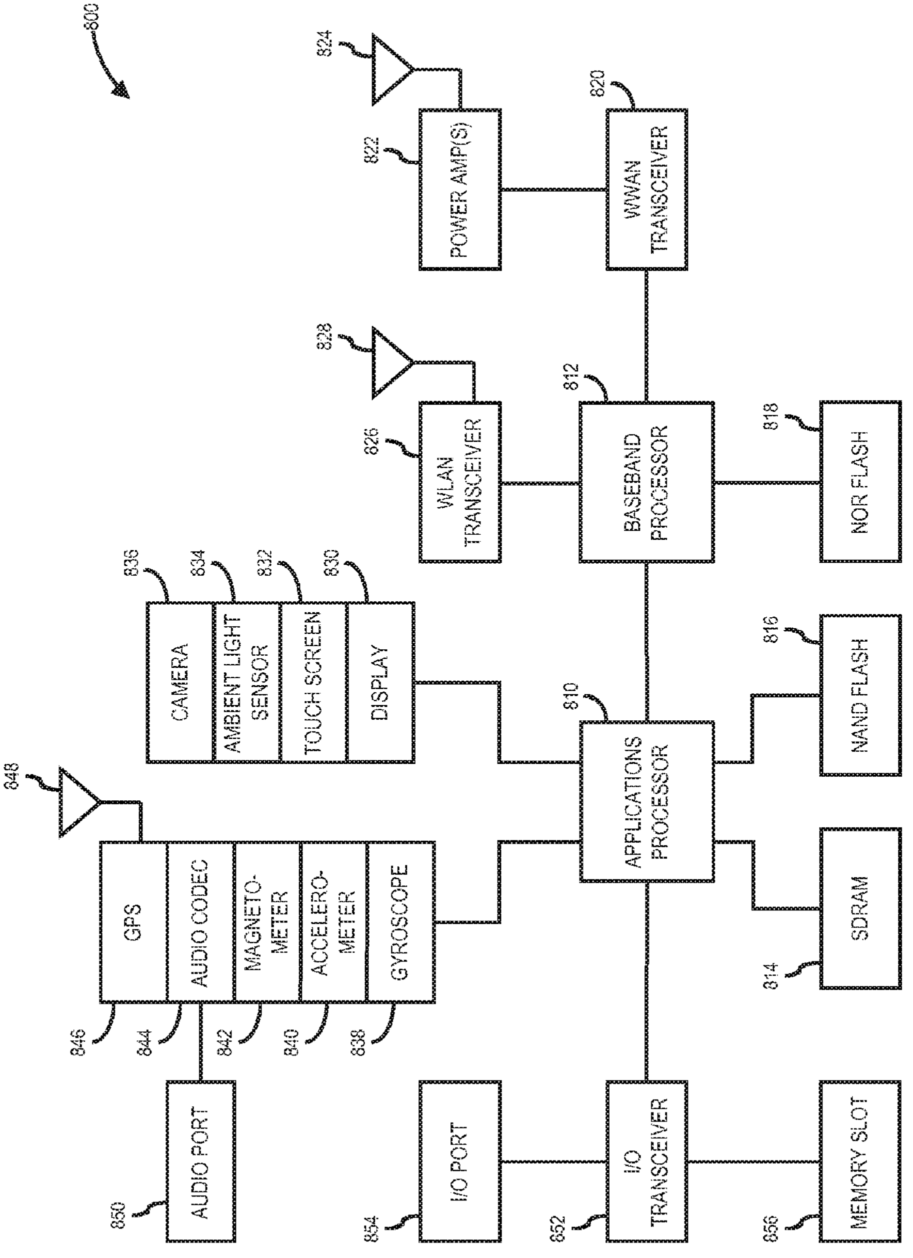
Figure 9:
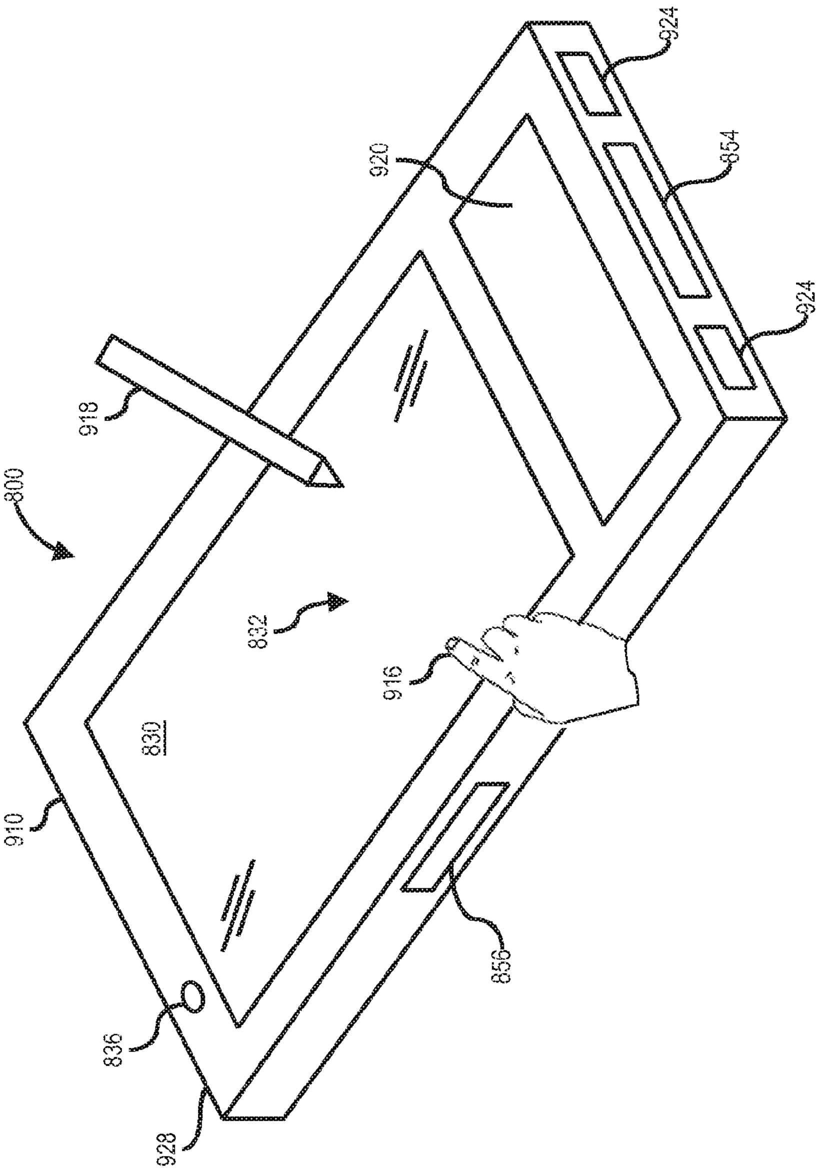

FIG. 6. is a flow diagram of a method for performing resource scheduling for machine-to-machine devices in accordance with one or more embodiments;

FIG. 7 is flow diagram illustrating a method of persistent scheduling for machine-to-machine devices in an IEEE 802.16m network in accordance with one or more embodiments;

FIG. 8 is a block diagram of an information handling system capable of utilizing resource scheduling in a machine-to-machine system in accordance with one or more embodiments;

FIG. 9 is an isometric view of an information handling system of FIG. 8 that optionally may include a touch screen in accordance with one or more embodiments.

It will be appreciated that for simplicity and/or clarity of illustration, elements illustrated in the figures have not necessarily been drawn to scale. For example, the dimensions of some of the elements may be exaggerated relative to other elements for clarity. Further, if considered appropriate, reference numerals have been repeated among the figures to indicate corresponding and/or analogous elements.

DETAILED DESCRIPTION

In the following detailed description, numerous specific details are set forth to provide a thorough understanding of claimed subject matter. However, it will be understood by those skilled in the art that claimed subject matter may be practiced without these specific details. In other instances, well-known methods, procedures, components and/or circuits have not been described in detail.

In the following description and/or claims, the terms coupled and/or connected, along with their derivatives, may be used. In particular embodiments, connected may be used to indicate that two or more elements are in direct physical and/or electrical contact with each other. Coupled may mean that two or more elements are in direct physical and/or electrical contact. However, coupled may also mean that two or more elements may not be in direct contact with each other, but yet may still cooperate and/or interact with each other. For example, "coupled" may mean that two or more elements do not contact each other but are indirectly joined together via another element or intermediate elements. Finally, the terms "on," "overlying," and "over" may be used in the following description and claims. "On," "overlying," and "over" may be used to indicate that two or more elements are in direct physical contact with each other. However, "over" may also mean that two or more elements are not in direct contact with each other. For example, "over" may mean that one element is above another element but not contact each other and may have another element or elements in between the two elements. Furthermore, the term "and/or" may mean "and", it may mean "or", it may mean "exclusive-or", it may mean "one", it may mean "some, but not all", it may mean "neither", and/or it may mean "both", although the scope of claimed subject matter is not limited in this respect. In the following description and/or claims, the terms "comprise" and "include," along with their derivatives, may be used and are intended as synonyms for each other.

Figure 1:
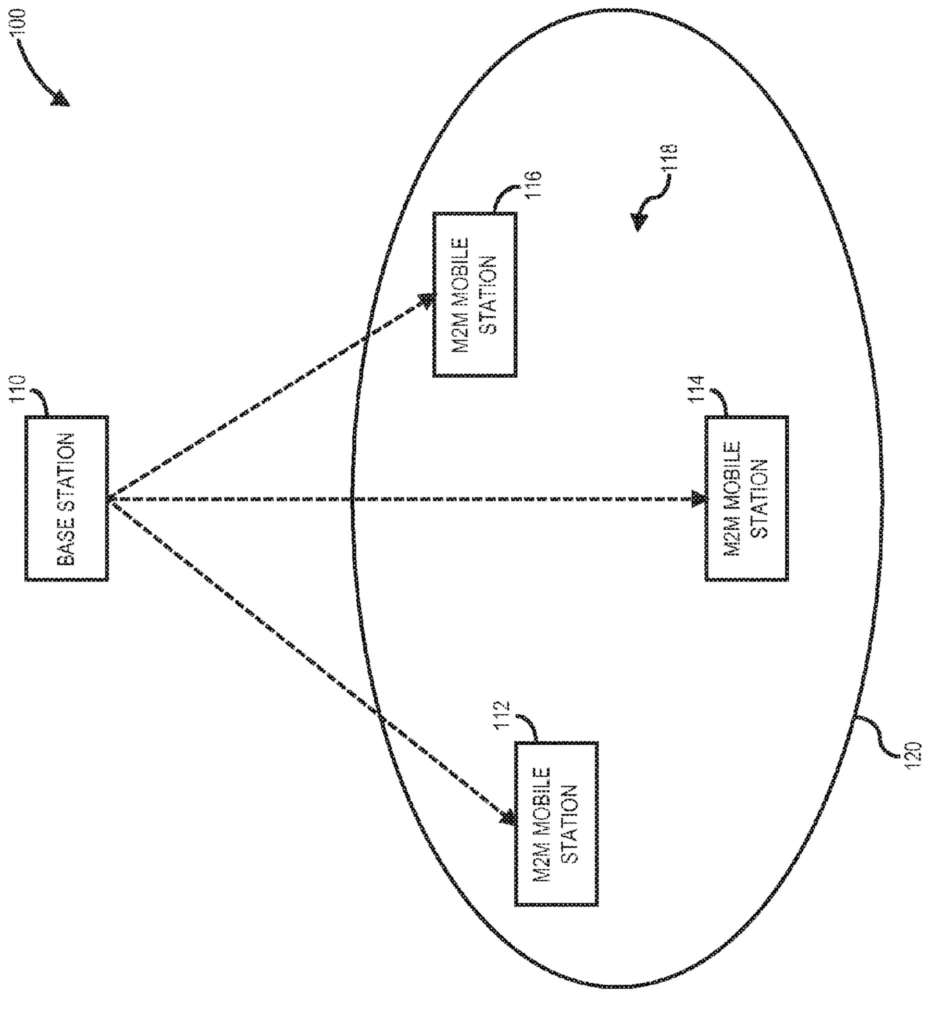
FIG. 1 is a diagram of a machine-to-machine system capable of implementing resource scheduling in accordance with one or more embodiments.

Referring now to FIG. 1, a diagram of a machine-to-machine system capable of implementing resource scheduling in accordance with one or more embodiments will be discussed. As shown in FIG. 1, a machine-to-machine (M2M) system 100 may comprise a base station 110 serving one or more M2M mobile stations such as M2M mobile station 112, M2M mobile station 114, and/or M2M mobile station 116. In one or more embodiments, M2M system operates in accordance with an Institute for Electrical and Electronics Engineers (IEEE) standard, for example the IEEE 802.16p standard. In one or more embodiments, base station 110 may serve the M2M mobiles stations together as an M2M group 118 wherein the M2M mobile stations are assigned a machine-to-machine (M2M) Group Identifier (MGID) as set forth in accordance with the IEEE 802.16p standard. In one or more embodiments, the MGID) comprises a identifier that uniquely identifies an M2M device group 118 in the domain of the network entity that assigns an MGID to a group to which one or more M2M devices belong. The domain of the network entity may be identified by an M2M zone 120. An MGID is assigned to one or more service flows of an M2M device by a network entity after initial network entry, and may be released during an explicit network exit such as a power down location update. The MGID may be retained by an M2M device even in an idle mode unless the M2M device exits from the network or if the network entity explicitly deletes the service flow associated with the MGID. The MGID may be reassigned during a normal, connected mode and during an idle mode.

In one or more embodiments, M2M system 100 may implement persistent scheduling to assign resource blocks to the one or more M2M devices in the M2M group 118. Persistent scheduling involves the scheduling of resource blocks for a device for a recurring period such that the resource blocks are always available for the device over N number of frames or subframes. However, M2M devices typically do not require a large number of resource blocks to transmit or receive data wherein the M2M data packets are generally too small to occupy multiple persistent frames for a long number of repeating intervals. As a result, in order to increase efficient utilization of resources, resource blocks for multiple M2M devices may be bundled together and scheduled in a persistent scheduling manner as shown in and described with respect to FIG. 2, below.

Figure 2:
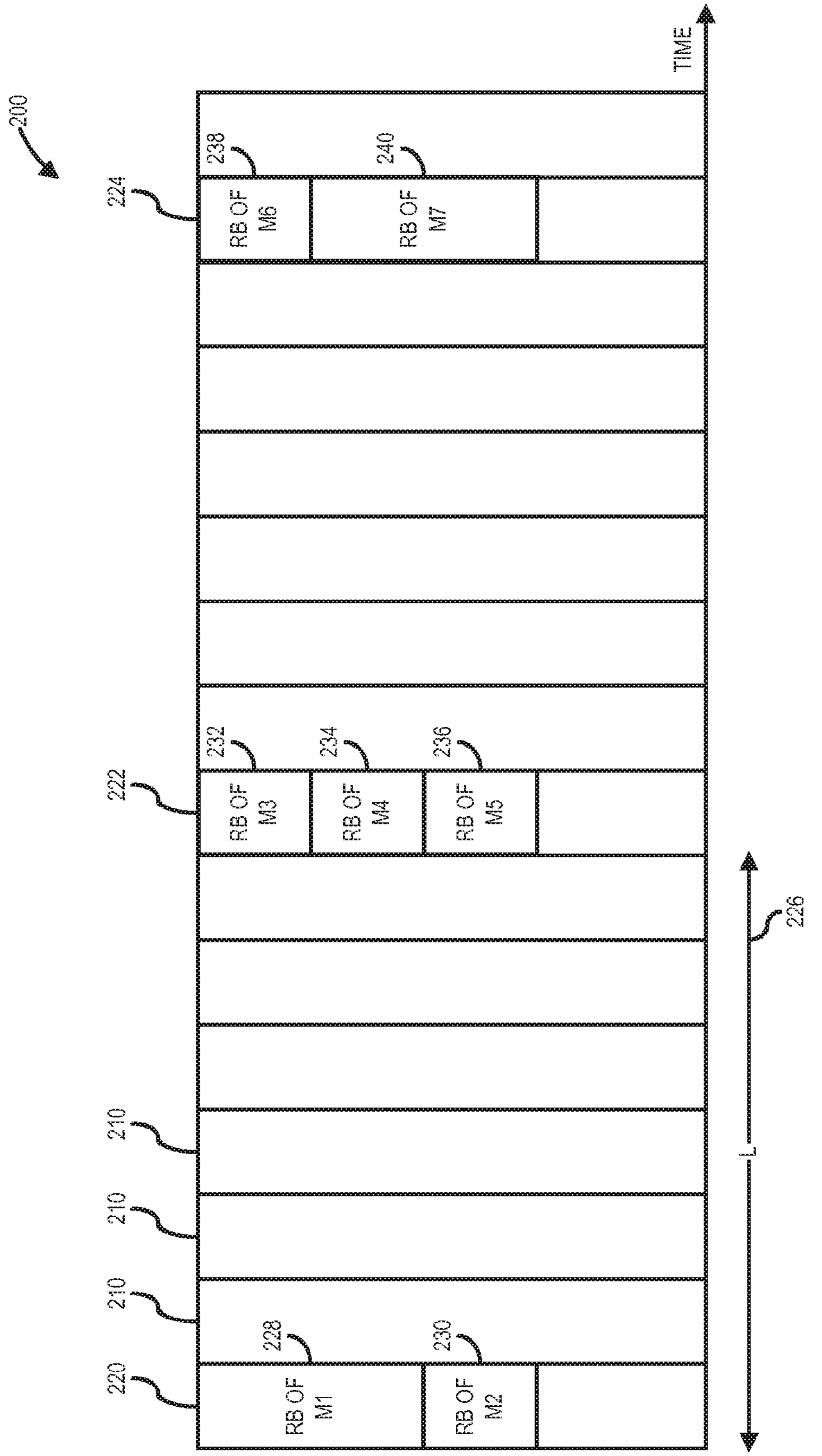
FIG. 2 is an diagram of a scheduling pattern for one or more machine-to-machine devices in accordance with one or more embodiments.

Referring now to FIG. 2, a diagram of a scheduling pattern for one or more machine-to-machine devices which are in the same M2M group in accordance with one or more embodiments will be discussed. As shown in FIG. 2, the scheduling pattern 200 illustrates multiple frames 210 over time in which common resource blocks for one or more M2M devices may be allocated. The data bursts from multiple M2M devices may be bundled together in a single frame wherein resource blocks for a first mobile device (M1) 228 are bundled in the same frame 220 with the resource blocks for a second mobile device (M2) 230. The assignment of data bursts to the multiple M2M devices may be persistent such that the frames available for M2M bursts may repeat every L number 226 of frames for the next $L^{th}$ frame 222, the next 2Lth frame 224, and so on. However, in the $L^{th}$ frame 222, resource blocks for a third M2M device (M3) 232 may be bundled with resource block for a fourth M2M device (M14) 234 and resource blocks for a fifth M2M device (M5) 236. Similarly, in the 2 $L^{th}$ frame 224 resource block resource blocks for a sixth M2M device (M6) 238 may be bundled with the resource blocks of a seventh M2M device (M7) 240. Thus, the availability of the frames may be persistently scheduled for a determined scheduling repeat period of L frames 226, however various resource blocks for multiple M2M devices may be bundled together within a given frame, and the resources blocks for multiple M2M devices bundled within a given frame may be different for different frames. Furthermore, M2M system 100 may transmit a common control message that is shared by all of the M2M devices within the same M2M group 118. Such a common control message may comprise an M2M Group MAC Control (MGMC) message, and the M2M devices may send a reply to the MGMC control message with an M2M acknowledgment (ACK) MAC Control (MAMC) message. However, this is merely one example of a common control message mechanism, and the scope of the claimed subject matter is not limited in this respect. A mechanism by which the resource blocks for multiple M2M devices may be mapped to a given available frame is shown in and described with respect to FIG. 3, below.

Figure 3:
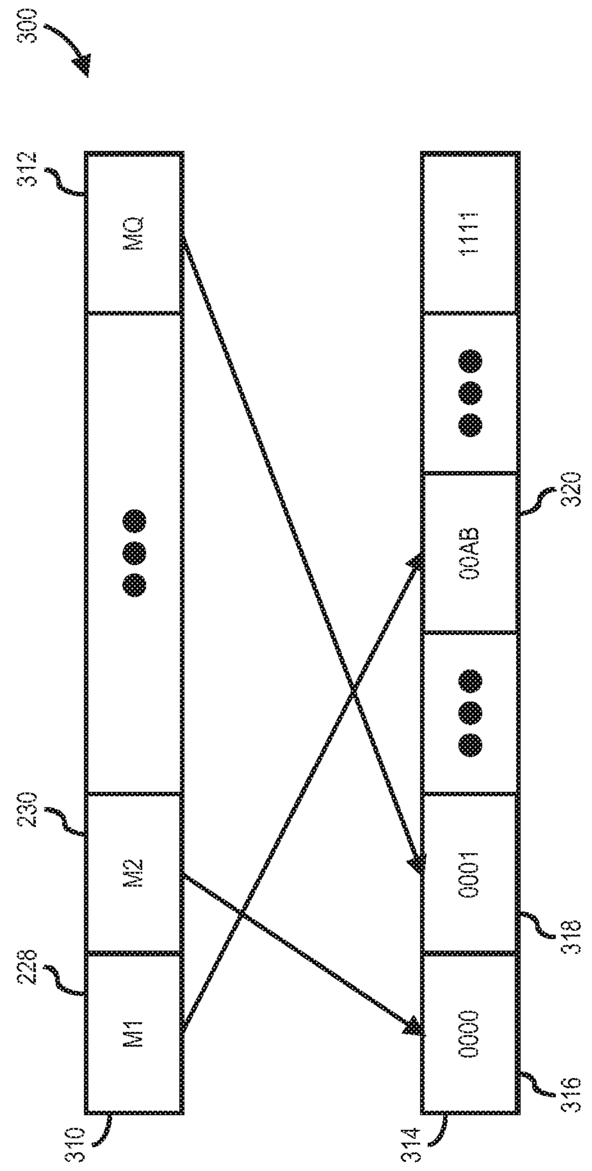
FIG. 3 is a diagram of scheduled device index mapping in accordance with one or more embodiments.

Referring now to FIG. 3, a diagram of scheduled device index mapping in accordance with one or more embodiments will be discussed. The index mapping scheme 300 of FIG. 3 may comprise mapping a scheduling machine-to-machine (M2M) device index array 310 with a scheduling M2M device identifier (ID) array 314. The scheduled devices index may be indicated by an M2M ID scheduling message (M2MID_Scheduling), which may be managed by a scheduler in base station 110. In one or more embodiments, multiple M2M devices may be grouped in an M2M group 118. The M2M group 118 ($MG_i$) comprises K number of multiple M2M devices ($M2M_{M1}$, $M2M_{M2}$, $M2M_{M43}$, . . . , $M2M_K$), where K is the number of M2M devices in the M2M group 118. The base station 110 allocates a series of resources to a specific M2M group 118 persistently. The scheduled devices list may comprise device M1 228, M2 230, up to device MQ 312 for the duration in which the group scheduling message is valid. The scheduling activated duration may be denoted as:

$$L_{scheduling\_active}=P*I_{repeat}$$

wherein P is the total packet size (total_packet_size) divided by the packet size period (packet_size_period), and P is less than or equal to K. Thus, the scheduler in the base station 110 may map the device index for M2M device M1 228 to M2M device ID (00AB) 320, the index for M2M device M2 230 to M2M device ID) (0000) 316, the index for M2M device MQ 312 to the device ID (0001) 318, and so on. The details of the resource allocation may be a function of the packet size of the scheduled devices. Solutions for specific resource index mapping is shown in and described with respect to FIGS. 4A-4C, below.

Figure 4A:
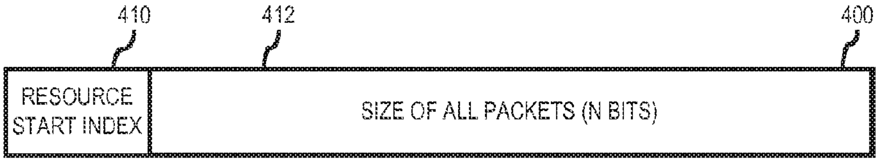
FIG. 4A-4C are diagrams of various resource index mapping schemes in accordance with one or more embodiments.
Figure 4B:
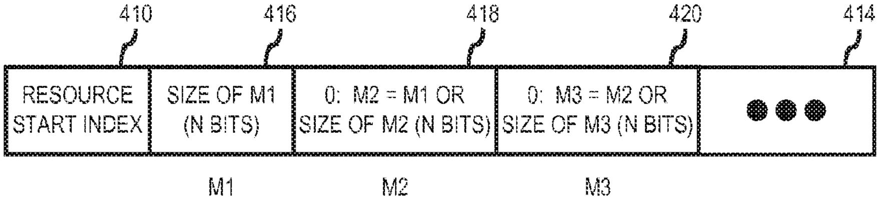
Figure 4C:
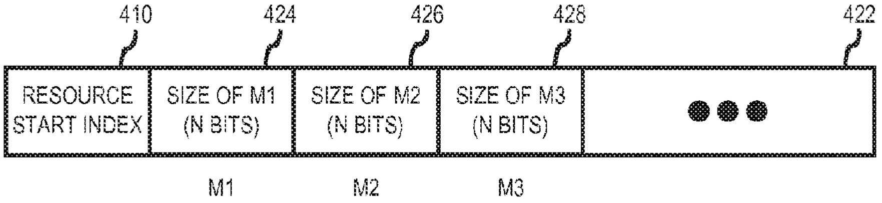

Referring now to FIGS. 4A-4C, diagrams of various resource index mapping schemes in accordance with one or more embodiments will be discussed. The index mapping scheme 400 shown in FIG. 4A may be utilized if the data packet size for each of the M2M devices is exactly the same. The scheme 400 starts with a resource start index payload block 410 followed by a payload block 412 that comprises the size of all of the packets as indicated by N bit signaling. The index mapping scheme 400 may reduce signaling buy may provide a lower amount of flexibility. The index mapping scheme 414 shown in FIG. 4B may be utilized if the data packet size of each of the M2M devices is similar. The scheme 414 starts with a resource start index block 410, and the payload block 416 for device index M1 is allocated the size of the M1 data packet indicated by N bit signaling. The payload block 418 for the device index M2 is allocated as either the same size as the payload block 416 for device index M1 if the data packet size of device M2 is the same size as the data packet of device M1. Otherwise, the payload block 418 is allocated as the size of the data packet for device M2 indicated by N bit signaling. Similarly, the payload block 420 for the device index M3 is allocated as either the same size as the payload block 418 for device index M2 if the data packet size of the device M3 is the same size as the data packet of device M2. Otherwise, the payload block 420 is allocated as the size of the data packet for device M3 indicated by N bit signaling. This allocation scheme continues until the resource blocks for data packets of all of the M2M devices has been allocated. In such an arrangement, the signaling overhead may be increased with more flexibility than the arrangement shown in FIG. 4A. The index mapping scheme 422 as shown in FIG. 4C may be utilized if the data packet size of the M2M devices is different. The scheme 422 starts with a resource index block 410, and the payload block 424 for device index M1 is the size of the data packet for M1 indicated by N bit signaling. The payload block 426 for device index M2 is the size of the data packet for device M2 indicated by N bit signaling, and the payload block 428 for device index M3 is the size of the data packet for device M3 indicated by N bit signaling, and so on. Since the resource blocks are explicitly assigned for each of the data packets of the respective M2M devices, the index mapping scheme 422 of FIG. 4C may provide a greater amount of flexibility. After resource block allocation with any of the index mapping schemes of FIG. 4A, FIG. 4B, or FIG. 4C, the M2M devices in an M2M group 118 will transmit or receive their data packets one by one according to the resource allocation message as defined in the respective index mapping schemes. Furthermore, in one or more embodiments, to provide additional flexibility, it may be possible to utilize a dynamic scheduling mechanism for any one or more of the M2M devices in an M2M group in which case the dynamic scheduling mechanism may at least temporarily override the persistent scheduling mechanism as needed.

Figure 5:
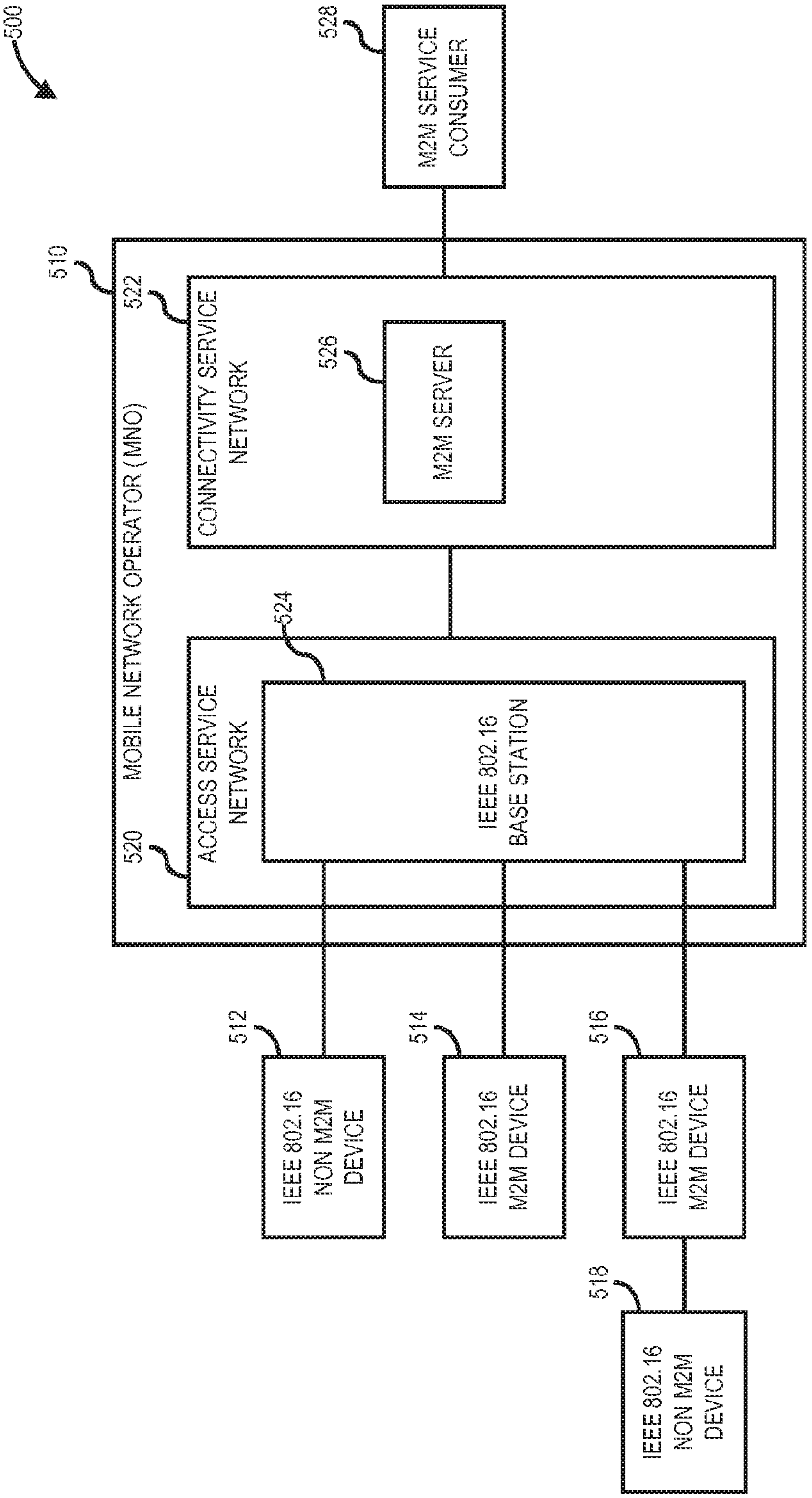
FIG. 5 is a diagram of an example architecture of a machine-to-machine (M2M) system as shown in FIG. 1 illustrating the mobile network operator and the service consumer in accordance with one or more embodiments.

Referring now to FIG. 5 is a diagram of an example architecture of a machine-to-machine (M2M) system as shown in FIG. 1 above illustrating the mobile network operator and the service consumer in accordance with one or more embodiments will be discussed. As shown in FIG. 5, the architecture 500 shown in FIG. 5 may be for an M2M system 100 as shown in FIG. 1, wherein architecture 500 includes a mobile network operator (MNO) 510 to manage one or more M2M devices such as M2M device 514 and/or M2M device 516, and/or one or more non M2M devices such as non M2M device 512 and/or non M2M device 518. In any event, the architecture 500 may be implemented in an Institute of Electrical and Electronics Engineers (IEEE) compliant network such as an IEEE 802.16 network such as an IEEE 802.16p network based on IEEE 802.16e network to implement a Worldwide Interoperability for Microwave Access (WiMAX) system, or an IEEE 802.16p network based on IEEE 802.16m network to implement a WiMAX-II system, although the scope of the claimed subject matter is not limited in this respect. In such embodiments, the non M2M devices may be capable of operating according to an IEEE 802.16 standard, and the M2M devices also may be capable of operating according to an IEEE 802.16 standard, in particular an IEEE 802.16p standard, although the scope of the claimed subject matter is not limited in this respect. Alternatively, architecture 500 may be in compliance with a Third Generation Partnership Project (3GPP) standard such as a 3G system, or may be in compliance with a Long Term Evolution (LTE) or an LTE-Advanced system such as a 4G system, although the scope of the claimed subject matter is not limited in this respect.

In some embodiments, both M2M devices and non M2M devices may be capable of directly communicating with mobile network operator 510, and in some embodiments, a non M2M device 518 may be capable of indirectly communicating with mobile network operator 510 via an M2M device 516 in order for such a non M2M device 518 to provide M2M services. The devices may communicate via a wireless air interface via an IEEE 802.16 compliant base station 524 as part of an IEEE 802.16 Access Service Network (ASN) 520. The Access Service Network 520 may be coupled to a Connectivity Service Network (CSN) 522 which may include one or more M2M servers 526. The M2M server 526 may then couple with an M2M service consumer 528, which may be coupled to mobile network operator 510 via a network such as the Internet, in order for M2M service consumer 528 to receive M2M services from the M2M devices and/or non M2M devices via the mobile network operator 510. It should be noted that the architecture 500 an M2M network as shown in FIG. 5 is merely one example network architecture wherein other types of network architectures may be provided to implement an M2M system 100, and the scope of the claimed subject matter is not limited in this respect.

Referring now to FIG. 6, a flow diagram of a method for performing resource scheduling for machine-to-machine devices in accordance with one or more embodiments will be discussed. Method 600 illustrates one particular embodiment of a method for resource scheduling for M2M devices in an in an M2M system. However, in one or more alternative embodiments, various other orders of the blocks of method 600 may be implemented, with more or fewer blocks, and the scope of the claimed subject matter is not limited in this respect. At block 610, one or more M2M devices are grouped to an M2M group, for example M2M group 118 as shown in FIG. 1. A determination is made at decision block 612 if data transmission is initiated. the data transmission may be initiated by the base station 110, or by the M2M mobile station. If data transmission is not initiated, the decision block 612 may loop until data transmission is initiated. If data transmission is initiated, the base station 110 may allocate a series resource to the M2M devices in the M2M group 118 at block 614. The resources may be allocated via persistent mechanism over the physical downlink control channel or other higher layer signaling, for example via an M2M Group Media Access Control (MGMC) message in IEEE 802.16p as shown in and described herein, for example with respect to FIG. 2. The persistent mechanism may include the scheduling uses the index, a scheduling resource block index and a resource block allocation interval. A determination may then be made at decision block 616 if a resource block for M2M device index i has been allocated. The index i may be utilized to indicate the $i^{th}$ M2M device in the M2M group 118. If the resource block has not been allocated, then method 600 continues at block 614 until the resource blocks for the M2M devices have been allocated. If the resource block for M2M device $M2M_i$ has been allocated, $M2M_i$ device in the M2M group 118 may transmit and/or receive data to or from the base station 110 at block 618. A determination may then be made at decision block 620 if the transmission of all data packets from all of the M2M devices in the M2M group 118 is complete. If data transmission is not complete, then the M2M device index i may be incremented by one at block 622, and the method 600 may continue at block 616 until all data has been transmitted from all of the M2M devices. If transmission is complete, then the M2M devices may enter into an idle mode at block 624.

Referring now to FIG. 7, a flow diagram illustrating a method of persistent scheduling for machine-to-machine devices in an IEEE 802.16m network in accordance with one or more embodiments will be discussed. Method 700 illustrates one particular embodiment of a method of persistent resource scheduling for M2M devices within the idle mode in an in an M2M system also. However, in one or more alternative embodiments, various other orders of the processes of method 600 may be implemented, with more or fewer processes, and the scope of the claimed subject matter is not limited in this respect. Method 700 illustrates the process flow between the base station 110 and an M2M device in the idle mode such as M2M mobile station 112 of FIG. 1. In accordance with one or more embodiments, the persistent scheduling for the M2M service may be optimized wherein the M2M device can send the data packet in a pre-allocated channel in an idle mode so that the process of network reentry and bandwidth request/allocation may be saved, and the inter-arrival time for persistent scheduling can be much longer, for example on the order of minutes, hours or even days based on the traffic characteristics of M2M devices. As shown in FIG. 7, when an M2M device 112 is in connected mode after network entry and registration, the M2M device 112 will notify the service flow characteristics to the base station 110, for example by using a dynamic service addition request (DSA-REQ) message 710 and a dynamic service addition response (DSA-RSP) message 712 from base station 110 as described in the IEEE 802.16 standards. If the traffic pattern is periodic or predictable, the base station 110 will pre-allocate the channel to the M2M device 112 with data channel allocation information and control channel allocation for uplink (UL) synchronization persistent application 716 and the allocation period of validity as described herein. After data transmission is complete, the M2M device 112 can switch to an idle mode for power saving. During the idle mode, when there is M2M data to be sent, if UL synchronization is lost, the M2M device 110 will go through a ranging process 718 or other UL synchronization process to capture the UL synchronization and revise the transmission parameters using a pre-allocated control channel. The M2M device 112 may then send the data in pre-allocated data channel via process 720, wherein the data optionally may be encrypted, and then the M2M device may then go back to the sleep/idle state if the M2M device receives an acknowledgement message 722 from the base station, or if some other termination condition is met. The M2M device 112 may periodically reawake from idle based at least in part on the idle mode persistent scheduling after some inter-arrival period 724, for example second, minutes, hours, days, and so on, and repeat additional data transmissions via ranging process 726, UL data transmission process 728, and acknowledgement reception process 730. If there is a bursty M2M data to be sent where there is no pre-allocated channel for the data, the M2M device 112 may utilize the random channel and process to send the data. The base station 110 may then deallocate or reallocate the UL persistent scheduling for the M2M service via process 732, and/or the M2M device 112 may request to deallocate or reallocate the UL persistent scheduling via process 732.

Referring now FIG. 8, a block diagram of an information handling system capable of utilizing resource scheduling in a machine-to-machine system in accordance with one or more embodiments will be discussed. Information handling system 800 of FIG. 8 may tangibly embody one or more of any of the network elements or devices of the M2M system 100 as shown in and described with respect to FIG. 1. For example, information handling system 900 may represent the hardware of M2M mobile station 112, M2M mobile station 114, M2M mobile station 116*m* or base station 110 and/or other base stations, with greater or fewer components depending on the hardware specifications of the particular device or network element. Although information handling system 800 represents one example of several types of computing platforms, information handling system 800 may include more or fewer elements and/or different arrangements of elements than shown in FIG. 8, and the scope of the claimed subject matter is not limited in these respects.

In one or more embodiments, information handling system 800 may include an applications processor 810 and a baseband processor 812. Applications processor 810 may be utilized as a general purpose processor to run applications and the various subsystems for information handling system 800. Applications processor 810 may include a single core or alternatively may include multiple processing cores wherein one or more of the cores may comprise a digital signal processor or digital signal processing core. Furthermore, applications processor 810 may include a graphics processor or coprocessor disposed on the same chip, or alternatively a graphics processor coupled to applications processor 810 may comprise a separate, discrete graphics chip. Applications processor 810 may include on board memory such as cache memory, and further may be coupled to external memory devices such as synchronous dynamic random access memory (SDRAM) 814 for storing and/or executing applications during operation, and NAND) flash 816 for storing applications and/or data even when information handling system 800 is powered off. Baseband processor 812 may control the broadband radio functions for information handling system 800. Baseband processor 812 may store code for controlling such broadband radio functions in a NOR flash 818. Baseband processor 812 controls a wireless wide area network (WWAN) transceiver 820 which is used for modulating and/or demodulating broadband network signals, for example for communicating via a WiMAX network based on IEEE 802.16p or 3GPP or 4G LTE network or the like. The WWAN transceiver 820 couples to one or more power amps 822 respectively coupled to one or more antennas 824 for sending and receiving radio-frequency signals via the WWAN broadband network. The baseband processor 812 also may control a wireless local area network (WLAN) transceiver 826 coupled to one or more suitable antennas 828 and which may be capable of communicating via a Wi-Fi, Bluetooth, and/or an amplitude modulation (AIM) or frequency modulation (FM) radio standard including an IEEE 802.11a/b/g/n standard or the like. It should be noted that these are merely example implementations for applications processor 810 and baseband processor 812, and the scope of the claimed subject matter is not limited in these respects. For example, any one or more of SDRAM 814, NAND flash 816 and/or NOR flash 818 may comprise other types of memory technology such as magnetic memory, chalcogenide memory, phase change memory, or ovonic memory, and the scope of the claimed subject matter is not limited in this respect.

In one or more embodiments, applications processor 810 may drive a display 830 for displaying various information or data, and may further receive touch input from a user via a touch screen 832 for example via a finger or a stylus. An ambient light sensor 834 may be utilized to detect an amount of ambient light in which information handling system 800 is operating, for example to control a brightness or contrast value for display 830 as a function of the intensity of ambient light detected by ambient light sensor 834. One or more cameras 936 may be utilized to capture images that are processed by applications processor 810 and/or at least temporarily stored in NAND flash 816. Furthermore, applications processor may couple to a gyroscope 838, accelerometer 840, magnetometer 842, audio coder/decoder (CODEC) 844, and/or global positioning system (GPS) controller 846 coupled to an appropriate GPS antenna 948, for detection of various environmental properties including location, movement, and/or orientation of information handling system 800. Alternatively, controller 846 may comprise a Global Navigation Satellite System (GNSS) controller. Audio CODEC 844 may be coupled to one or more audio ports 850 to provide microphone input and speaker outputs either via internal devices and/or via external devices coupled to information handling system via the audio ports 850, for example via a headphone and microphone jack. In addition, applications processor 810 may couple to one or more input/output (I/O) transceivers 852 to couple to one or more I/O ports 854 such as a universal serial bus (USB) port, a high-definition multimedia interface (HDMI) port, a serial port, and so on. Furthermore, one or more of the I/O transceivers 852 may couple to one or more memory slots 856 for optional removable memory such as secure digital (SD) card or a subscriber identity module (SIM) card, although the scope of the claimed subject matter is not limited in these respects.

Referring now to FIG. 9, an isometric view of an information handling system of FIG. 8 that optionally may include a touch screen in accordance with one or more embodiments will be discussed. FIG. 9 shows an example implementation of information handling system 800 of FIG. 8 tangibly embodied as a cellular telephone, smartphone, or tablet type device or the like. In one or more embodiments, the information handling system 800 may comprise any one of the infrastructure nodes and/or the mobile stations of FIG. 1, although the scope of the claimed subject matter is not limited in this respect. The information handling system 800 may comprise a housing 910 having a display 830 which may include a touch screen 832 for receiving tactile input control and commands via a finger 916 of a user and/or a via stylus 918 to control one or more applications processors 810. The housing 910 may house one or more components of information handling system 800, for example one or more applications processors 810, one or more of SDRAM 814, NAND) flash 816, NOR flash 818, baseband processor 812, and/or WWAN transceiver 820. The information handling system 800 further may optionally include a physical actuator area 920 which may comprise a keyboard or buttons for controlling information handling system via one or more buttons or switches. The information handling system 800 may also include a memory port or slot 856 for receiving non-volatile memory such as flash memory, for example in the form of a secure digital (SD) card or a subscriber identity module (SIM) card. Optionally, the information handling system 800 may further include one or more speakers and/or microphones 924 and a connection port 854 for connecting the information handling system 800 to another electronic device, dock, display, battery charger, and so on. In addition, information handling system 800 may include a headphone or speaker jack 928 and one or more cameras 836 on one or more sides of the housing 910. It should be noted that the information handling system 800 of FIG. 9 may include more or fewer elements than shown, in various arrangements, and the scope of the claimed subject matter is not limited in this respect.

Although the claimed subject matter has been described with a certain degree of particularity, it should be recognized that elements thereof may be altered by persons skilled in the art without departing from the spirit and/or scope of claimed subject matter. It is believed that the subject matter pertaining to resource scheduling for machine-to-machine devices and/or many of its attendant utilities will be understood by the forgoing description, and it will be apparent that various changes may be made in the form, construction and/or arrangement of the components thereof without departing from the scope and/or spirit of the claimed subject matter or without sacrificing all of its material advantages, the form herein before described being merely an explanatory embodiment thereof, and/or further without providing substantial change thereto. It is the intention of the claims to encompass and/or include such changes.

What is claimed is:

1. An article of manufacture comprising a non-transitory storage medium having instructions stored thereon that, if executed by a processor, result in:

scheduling resources for two or more devices in one or more groups with a repeated pattern for a periodic duration;

allocating resource blocks for the two or more devices within the scheduled resources;

wherein said allocating comprises mapping data packets for two or more of the two or more devices as a single resource block if the data packets for all of the two or more devices have a same size, or otherwise mapping data packets for two or more of the two or more devices as resource blocks representing respective sizes of respective data packets for respective devices if the data packets for the two or more devices have different sizes; and receiving data packets transmitted from the two or more devices together in the allocated resource blocks.

2. An article of manufacture as claimed in claim 1, wherein the instructions if executed further result in:

if transmission is not complete for all of the two or more devices, receiving data packets transmitted from a next device of the two or more devices at a next resource block.

3. An article of manufacture as claimed in claim 1, wherein the two or more devices comprise machine-to-machine (M2M) devices and one or more of the groups comprises an M2M group.

4. An article of manufacture as claimed in claim 1, wherein the scheduled resources comprise at least one or more frames or one or more subframes.

5. An article of manufacture as claim in claim 1, wherein information of said scheduling is transmitted in a machine-to-machine identifier scheduling message (M2M_Scheduling).

6. An information handling system, comprising:

a baseband processor coupled to one or more wireless transceivers, wherein the baseband processor is configured to:

schedule resources for two or more devices in one or more groups with a repeated pattern for a periodic duration;

allocate resource blocks for the two or more devices within the scheduled resources;

wherein said allocating comprises mapping data packets for two or more of the two or more devices as a single resource block if the data packets for all of the two or more devices have a same size, or otherwise mapping data packets for two or more of the two or more devices as resource blocks representing respective sizes of respective data packets for respective devices if the data packets for the two or more devices have different sizes; and receive data packets transmitted from the two or more devices together in the allocated resource blocks.

7. An information handling system as claimed in claim 6, wherein the instructions if executed further result in:

if transmission is not complete for all of the two or more devices, receiving data packets transmitted from a next device of the two or more devices at a next resource block.

8. An information handling system as claimed in claim 6, wherein the two or more devices comprise machine-to-machine (M2M) devices and one or more of the groups comprises an M2M group.

9. An information handling system as claimed in claim 6, wherein the scheduled resources comprise at least one or more frames or one or more subframes.

10. An information handling system as claimed in claim 6, wherein information of said scheduling is transmitted in a machine-to-machine identifier scheduling message (M2M_Scheduling).

* * * * *